(12) United States Patent
Evans et al.

(10) Patent No.: US 8,433,656 B1
(45) Date of Patent: Apr. 30, 2013

(54) GROUP LICENSES FOR VIRTUAL OBJECTS IN A DISTRIBUTED VIRTUAL WORLD

(75) Inventors: James Evans, Apex, NC (US); Richard J. Walsh, Raleigh, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 1203 days.

(21) Appl. No.: 11/762,459

(22) Filed: Jun. 13, 2007

(51) Int. Cl.
G06F 21/00 (2006.01)

(52) U.S. Cl.
USPC ............. 705/59; 705/902; 715/751; 715/757; 463/29; 463/32; 463/42

(58) Field of Classification Search ............... 705/59, 705/902; 463/29, 32, 42; 715/751, 757
See application file for complete search history.

(56) References Cited

U.S. PATENT DOCUMENTS

| | | | |
|---|---|---|---|
| 5,109,483 A | 4/1992 | Baratz et al. | |
| 5,835,724 A | 11/1998 | Smith | |
| 5,892,900 A * | 4/1999 | Ginter et al. | 726/26 |
| 5,940,504 A | 8/1999 | Griswold | |
| 5,956,038 A | 9/1999 | Rekimoto | |
| 5,982,390 A * | 11/1999 | Stoneking et al. | 345/474 |
| 6,041,357 A | 3/2000 | Kunzelman et al. | |
| 6,119,229 A * | 9/2000 | Martinez et al. | 726/28 |
| 6,151,027 A * | 11/2000 | Yoo | 345/423 |
| 6,229,533 B1 * | 5/2001 | Farmer et al. | 345/473 |
| 6,285,380 B1 | 9/2001 | Perlin et al. | |
| 6,499,035 B1 | 12/2002 | Sobeski | |
| 6,577,328 B2 | 6/2003 | Matsuda et al. | |
| 6,766,373 B1 | 7/2004 | Beadle et al. | |
| 6,767,287 B1 | 7/2004 | Mcquaid et al. | |
| 6,912,565 B1 | 6/2005 | Powers et al. | |
| 6,938,085 B1 | 8/2005 | Belkin et al. | |
| 6,951,516 B1 | 10/2005 | Eguchi et al. | |
| 7,010,605 B1 | 3/2006 | Dharmarajan | |
| 7,065,553 B1 | 6/2006 | Chesley et al. | |
| 7,127,514 B2 | 10/2006 | Hunt | |
| 7,133,368 B2 | 11/2006 | Zhang et al. | |

(Continued)

FOREIGN PATENT DOCUMENTS

| KR | 1020030036290 | 5/2003 |
|---|---|---|
| WO | 98/47091 A1 | 10/1998 |

(Continued)

OTHER PUBLICATIONS

Edward Castronova, "On Virtual Economy", Jul. 2002.*

(Continued)

*Primary Examiner* — Steven Kim
(74) *Attorney, Agent, or Firm* — Withrow & Terranova, PLLC

(57) ABSTRACT

A group licensing scheme for validating groups of virtual objects within a distributed virtual world is provided. Each of a number of distributed virtual world servers hosts a cell, or virtual space, of the virtual world. In operation, a first virtual world server categorizes virtual objects into a number of groups. Either before or after creating the groups, the first virtual world server validates each virtual object individually. Once the virtual objects are validated and the groups are formed, the first virtual world server generates a group license for each of the groups. When a group of virtual objects or an avatar associated with one or more groups of virtual objects moves to a virtual space hosted by a second virtual world server, the corresponding group licenses are provided to the second virtual world server, which validates the one or more groups of virtual objects based on the group licenses.

28 Claims, 3 Drawing Sheets

U.S. PATENT DOCUMENTS

| | | | |
|---|---|---|---|
| 7,249,139 B2 * | 7/2007 | Chuah et al. | 1/1 |
| 7,293,235 B1 * | 11/2007 | Powers et al. | 715/706 |
| 7,342,587 B2 * | 3/2008 | Danzig et al. | 345/473 |
| 7,421,708 B2 | 9/2008 | Vass et al. | |
| 7,720,733 B2 * | 5/2010 | Jung et al. | 705/35 |
| 7,814,154 B1 * | 10/2010 | Kandekar et al. | 709/205 |
| 7,912,793 B1 * | 3/2011 | Danzig et al. | 705/400 |
| 7,937,314 B2 * | 5/2011 | Jung et al. | 705/37 |
| 7,995,064 B2 * | 8/2011 | Guymon et al. | 345/473 |
| 8,271,491 B2 * | 9/2012 | Iizuka | 707/736 |
| 2001/0052008 A1 | 12/2001 | Jacobus | |
| 2002/0161893 A1 | 10/2002 | Wical | |
| 2002/0188678 A1 | 12/2002 | Edecker et al. | |
| 2003/0014423 A1 | 1/2003 | Chuah et al. | |
| 2003/0115132 A1 | 6/2003 | Iggland | |
| 2003/0126245 A1 | 7/2003 | Feltin et al. | |
| 2003/0158839 A1 | 8/2003 | Faybishenko et al. | |
| 2003/0177187 A1 | 9/2003 | Levine et al. | |
| 2004/0019657 A1 | 1/2004 | Akiyama | |
| 2005/0021394 A1 | 1/2005 | Miedema et al. | |
| 2005/0204045 A1 | 9/2005 | Belkin et al. | |
| 2006/0095763 A1 | 5/2006 | Iyengar et al. | |
| 2006/0123127 A1 | 6/2006 | Littlefield | |
| 2006/0178967 A1 * | 8/2006 | Jung et al. | 705/35 |
| 2006/0178972 A1 * | 8/2006 | Jung et al. | 705/35 |
| 2006/0248573 A1 | 11/2006 | Pannu et al. | |
| 2007/0087819 A1 | 4/2007 | Van Luchene et al. | |
| 2007/0099685 A1 * | 5/2007 | Van Luchene | 463/1 |
| 2007/0112660 A1 * | 5/2007 | Jung et al. | 705/35 |
| 2007/0186212 A1 | 8/2007 | Mazzaferri et al. | |
| 2007/0191104 A1 * | 8/2007 | Van Luchene | 463/42 |
| 2008/0004116 A1 * | 1/2008 | Van Luchene et al. | 463/42 |
| 2008/0004120 A1 * | 1/2008 | Van Luchene et al. | 463/42 |
| 2008/0046222 A1 * | 2/2008 | Van Luchene | 703/6 |

FOREIGN PATENT DOCUMENTS

| | | |
|---|---|---|
| WO | 00/42555 A1 | 7/2000 |
| WO | WO 01/22273 A1 | 3/2001 |
| WO | 03/081447 A1 | 10/2003 |
| WO | 2007/011752 A2 | 1/2007 |

OTHER PUBLICATIONS

Joshua Fairfield, "Virtual Property", Oct. 2005, Indiana University School of Law-Bloomington.*

Richard A. Bartle, "Pitfalls of Virtual Property", Apr. 2004, The Themis Group.*

Screenshot of Wikipedia from Dec. 15, 2005.*

Beverly Yang et al., "Designing a Super-Peer Network," (article), 2003, 15 pages, ICDE, 19th International Conference on Data Engineering (ICDE'03).

No Author, Gnutella—Wikipedia, (website), obtained Feb. 20, 2007, 5 pages, http://en.wikipedia.org/wiki/Gnutella.

No Author, Gnutella 2—Wikipedia, (website), obtained Feb. 20, 2007, 4 pages, http://en.wikipedia.org/wiki/Gnutella2.

No Author, HTTP Cookie—Wikipedia, (website), obtained Feb. 5, 2009, 19 pages, http://en.wikipedia.org/wiki/HTTP_cookie.

Juan Li, "ECSP: An Efficient Clustered Super-Peer Architecture for P2P Networks," (article), Aug. 2003, 82 pages, The University of British Columbia.

No Author, "P2P and Content Distribution," (PowerPoint Presentation), Oct. 25, 2005, 20 pages, http://www.list.gmu.edu/zhang/isa767/p2p-6.pdf.

Nejdl Wolfgang et al., "Super-Peer-Based Routing Strategies for RDF-Based Peer-to-Peer Networks," (article), Nov. 18, 2003, 15 pages.

Yingwu Zhu et al., "A Super-Peer Based Lookup in Structured Peer-to-Peer Systems," (article), 2003, 6 pages.

Young-Bae Ko et al., "A Multicast Protocol for Physically Hierarchical Ad Hoc Networks," (article), 2003, 5 pages.

Shun-Yun Hu et al., "VON: A Scalable Peer-to-Peer Network for Virtual Environments," (article), Jul./Aug. 2006, pp. 22-31, vol. 20, issue 4, IEEE Network.

De Oliveira, Jauvane C. et al., "VELVET: An Adaptive Hybrid Architecture for VEry Large Virtual EnvironmenTs," (article), Dec. 2003, v. 12 No. 6, pp. 555-580.

Shun-Yun Hu et al., "Scalable Peer-to-Peer Networked Virtual Environment," in Proc. 3rd ACM SIGCOMM 2004 workshops on NetGames '04, Aug. 2004, pp. 129-133.

Takuji Iimum et al., "Zoned Federation of Game Servers: a Peer-to-peer Approach to Scalable Multi-player Online Games," in Proc. 3rd ACM SIGCOMM 2004 workshops on NetGames '04. Aug. 2004. pp. 116-120.

Jouni Smed et al., "A Review on Networking and Multiplayer Computer Games," Technical Report No. 454, Turku Centre for Computer Science, Apr. 2002.

"Multiverse Technology: An Overview" 2005, http://www.multiverse.net/platform/whitepapers/mv_overview.pdf.

Bjorn Knutsson et al., "Peer-to-Peer Support for Massively Multiplayer Games," In the 23rd Conference of the IEEE Communications Society (INFOCOM '04), Hong Kong, China, Mar. 2004.

Main Page—Solipsis, http://solipsis.netofpeers.net/wiki2/index.php/Main_Page, Feb. 6, 2007.

"The final COVEN multi-user VR platform—D1.4a The COVEN DIVE platform" http://coven.lanes.ac.uk/4/deliverables/del14a.pdf, Nov. 12, 1998.

Dive Tutorial, http://www.sios.se/dive/manual/tutorial/, Mar. 19, 2007.

Uni-verse Home, http://www.uni-verse.org/Uni-verse-Home.72.0.html, Mar. 19, 2007.

Uni-verse On-line Gaming, http://www.uni-verse.org/On-line-Gaming.49.0.html, Mar. 19, 2007.

Public-key cryptography—Wikipedia, http://en.wikipedia.org/wiki/Public-key_cryptography, Mar. 19, 2007.

Solipsis—Wikipedia, http://en.wikipedia.org/wiki/Solipsis, Mar. 19, 2007.

What is a Digital Signature? An introducton to Digital Signatures, by David Youd, http://www.youdzone.com/signature.html, Mar. 19, 2007.

Microsoft masthead frame with global toolbar, http://www.microsoft.com/resources/documentation/windows/xp/all/proddocs/en-us/sag_liceconcepts_401.mspx?mtr=true, Oct. 10, 2007.

Tanin, E. et al., "A Serverless 3D World," Proceedings of the 12th Annual ACM International Workshop on Geographic Information Systems, Nov. 12-13, 2004, ACM, New York, NY, 9 pages.

Schmalstieg, D. et al., "Sewing Worlds Together With SEAMS: A Mechanism to Construct Complex Virtual Environments," 1999, 16 pages.

Gehrmann, H., "P2P Based Distributed Virtual Reality. TerraPeer—A DVE Architecture and Implementation," Feb. 2004, Institute of Informatics and Mathematical Modeling, Technical University of Denmark (DTU), 200 pages.

Tanin, E. et al., "Building and Querying a P2P Virtual World," Geoinformatica, Mar. 2006, vol. 10, No. 1, Kluwer Academic Publishers, Hingham, MA, 22 pages.

Author Unknown, "Animal Crossing Wild World Instruction Booklet," Nintendo, copyright 2005, 24 pages.

* cited by examiner

US 8,433,656 B1

GROUP LICENSES FOR VIRTUAL OBJECTS IN A DISTRIBUTED VIRTUAL WORLD

FIELD OF THE INVENTION

The present invention relates to a distributed virtual world and more specifically to validating virtual objects within a distributed virtual world.

BACKGROUND OF THE INVENTION

Validation of virtual objects is crucial in preventing cheating in virtual worlds. More specifically, it is desirable to validate virtual objects or licenses issued to a user or avatar representing the user in the virtual world before permitting the user or avatar to interact with the virtual objects. However, there may be tens, hundreds, thousands, or even millions of users or avatars active in a virtual world at a particular point in time and each of the users or avatars may interact with a large number of virtual objects. As such, validating each virtual object individually before permitting a user or avatar to interact with the virtual object places a large load on the system and more specifically on a virtual world authority operating to issue and validate licenses as the number of users or avatars and virtual objects increases. Thus, there is a need for a system and method for efficiently validating virtual objects in a virtual world.

SUMMARY OF THE INVENTION

The present invention provides a group licensing scheme for validating groups of virtual objects within a distributed virtual world. In general, each of a number of distributed virtual world servers hosts a cell, or virtual space, of the virtual world. In one embodiment, a first virtual world server categorizes virtual objects within the virtual space hosted by the first virtual world server or associated with an avatar within the virtual space hosted by the first virtual world server into a number of groups. Either before or after creating the groups, the first virtual world server interacts with a virtual world authority to validate each virtual object individually. Once the virtual objects are validated and the groups are formed, the first virtual world server generates a group license for each of the groups. When a group of virtual objects or an avatar associated with one or more groups of virtual objects moves to a virtual space hosted by a second virtual world server, the corresponding group licenses are provided to the second virtual world server. Thereafter, the second virtual world server validates the one or more groups of virtual objects based on the group licenses rather than validating each of the virtual objects individually.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
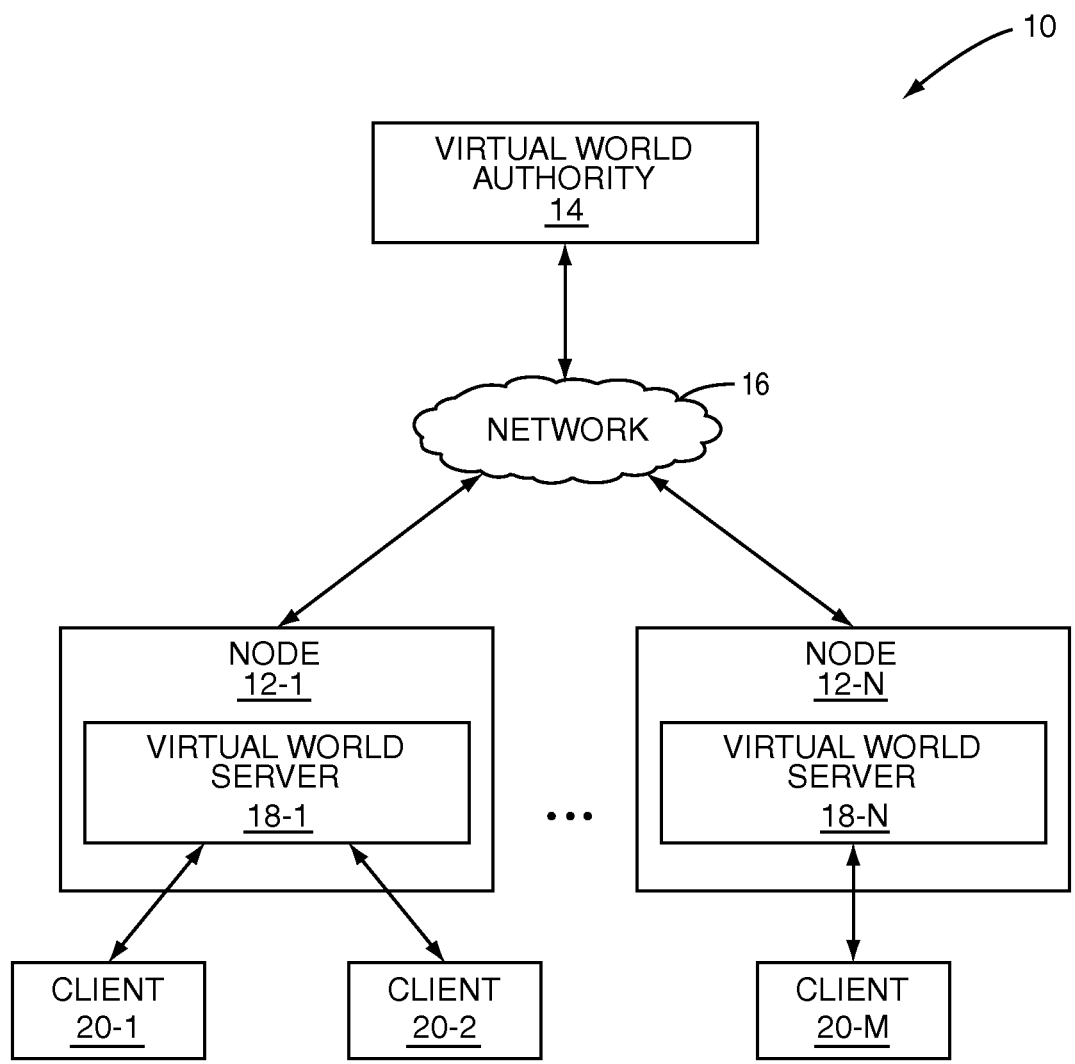
FIG. 1 illustrates a system implementing a distributed virtual world according to one embodiment of the present invention.

FIG. 1 illustrates a system 10 implementing a distributed virtual world according to one embodiment of the present invention. In general, the virtual world may be any virtual environment wherein a user is enabled to control an avatar to move throughout and to interact with the virtual environment. An avatar may be, for example, a two-dimensional or three-dimensional graphical representation of a user or a character controlled by the user. For example, the virtual world may be a Massively Multiplayer Online Role Playing Game (MMORPG), a virtual environment such as Second Life, or the like.

The system 10 includes a number of network nodes, or nodes, 12-1 through 12-N and a virtual world authority 14 interconnected via a network 16. The network 16 may be a Local Area Network (LAN), Wide Area Network (WAN), or the like, or any combination thereof. The network 16 may include wired components, wireless components, or a combination thereof. For example, the network 16 may be the Internet.

The nodes 12-1 through 12-N may be network devices such as, for example, a number of distributed gaming servers. Alternatively, the nodes 12-1 through 12-N may be user devices communicating via a Peer-to-Peer (P2P) overlay network to provide a distributed P2P virtual world. For example, each of the nodes 12-1 through 12-N may be a user device such as a gaming console such as an Xbox®, Playstation®, or Nintendo® Wii; a mobile gaming device such as a Playstation Portable® or Nintendo DS®; a mobile terminal such as a Personal Digital Assistant or mobile telephone; a personal computer; or the like.

The nodes 12-1 through 12-N include virtual world servers 18-1 through 18-N, respectively. The virtual world servers 18-1 through 18-N may be implemented in software, hardware, or a combination thereof. Each of the virtual world servers 18-1 through 18-N hosts a cell, or virtual space, of the virtual world. Clients 20-1 through 20-M communicate with the virtual world servers 18-1 through 18-N in order to render the virtual world to associated users and to enable those users to control their avatars to interact with the virtual world. In this example, clients 20-1 and 20-2 are associated with avatars currently within the virtual space hosted by the virtual world server 18-1. As such, the clients 20-1 and 20-2 are communicatively coupled to the virtual world server 18-1. Likewise, the client 20-M is associated with an avatar currently within the virtual space hosted by the virtual world server 18-N. As such, the client 20-M is communicatively coupled to the virtual world server 18-N.

The clients 20-1 through 20-M may be implemented in software and/or hardware and communicate with the virtual world servers 18-1 through 18-N to enable associated users to move their avatars throughout the virtual world and to interact with the virtual world. The clients 20-1 through 20-M may be implemented in user devices such as, for example, personal computers, gaming consoles, mobile gaming devices, mobile terminals, or the like. In one embodiment, if the nodes 12-1 through 12-N are user devices and the virtual world servers 18-1 through 18-N interact to provide a distributed P2P virtual world, at least some of the clients 20-1 through 20-M may be implemented on the nodes 12-1 through 12-N. The client devices 20-1 through 20-M may communicate with the nodes 12-1 through 12-N and more specifically the virtual world servers 18-1 through 18-N via the network 16 or via some separate network.

For more details of an exemplary distributed virtual world wherein each server hosts a virtual space of the virtual world, the interested reader is directed to U.S. patent application Ser. No. 11/693,152, entitled MESSAGE PROPAGATION IN A DISTRIBUTED VIRTUAL WORLD, which was filed Mar. 29, 2007 and is hereby incorporated by reference in its entirety.

The virtual world authority 14 operates to validate virtual objects within the virtual world. Validation of the virtual objects may be desired, for example, to prevent cheating in the virtual world by gaining access to or otherwise interacting with virtual objects that one has not legitimately obtained. More specifically, as discussed below, the virtual world authority 14 operates to issue licenses enabling users or their avatars to access or interact with virtual objects, validate licenses, and revoke licenses when appropriate. Note that while the virtual world authority 14 is illustrated as a single block, the virtual world authority 14 may be implemented on a single network device such as a server or implemented on a number of network devices in a distributed fashion.

Figure 2:
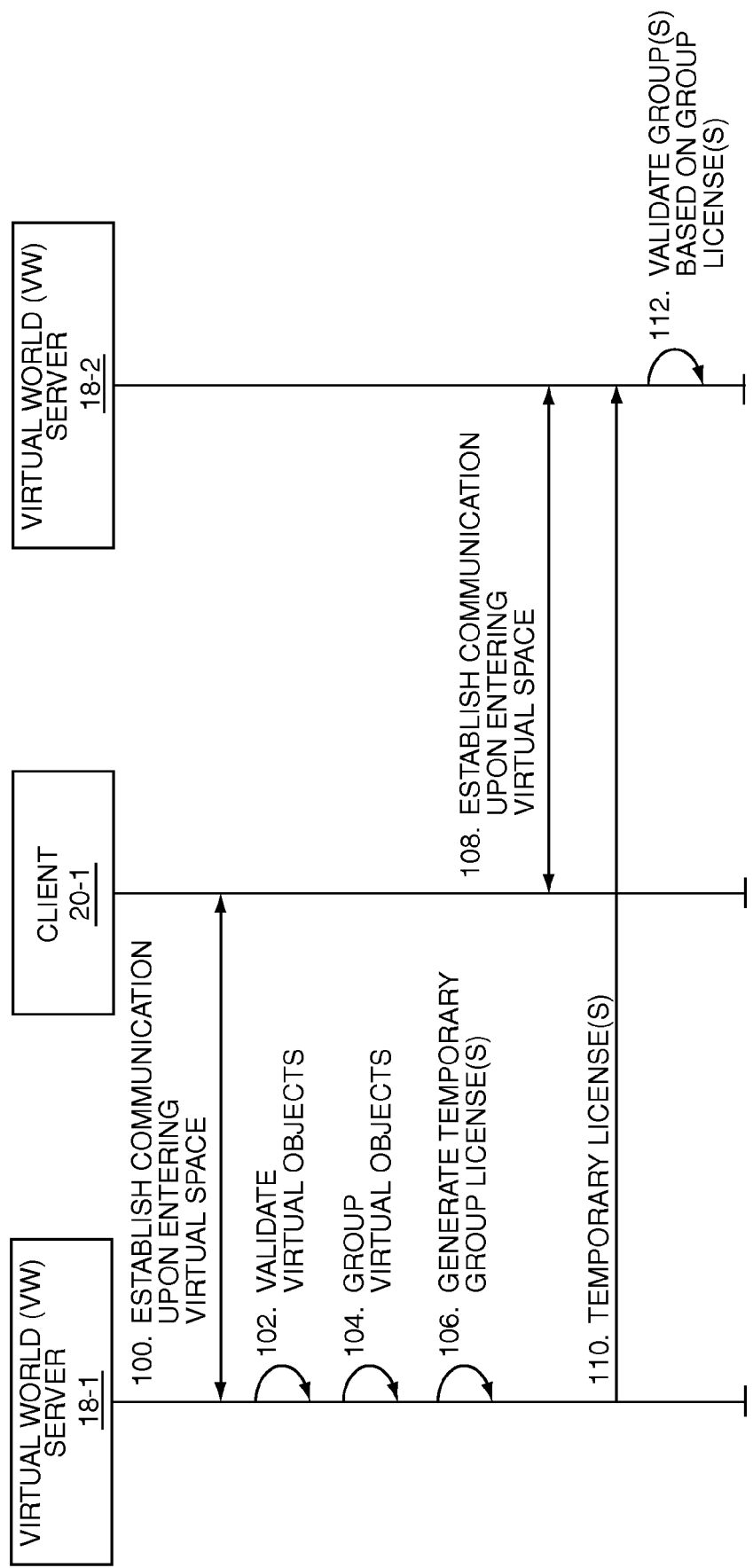
FIG. 2 illustrates a process for generating groups of virtual objects, issuing a group license for the virtual objects, and validating the group of virtual objects based on the group license according to one embodiment of the present invention.

FIG. 2 illustrates the operation of the system 10 of FIG. 1. First, when the avatar associated with the client 20-1 enters the virtual space hosted by the virtual world server 18-1, the client 20-1 establishes communication with the virtual world server 18-1 (step 100). In one embodiment, prior to permitting the avatar to access or interact with virtual objects, the virtual world server 18-1 validates the virtual objects or licenses issued to the user represented by the avatar for those virtual objects (step 102). More specifically, in one embodiment, the avatar or may carry with it or otherwise be associated with a number of virtual objects such as, for example, clothing, weapons, maps, or the like. Before permitting the avatar to access or interact with those virtual objects, the virtual world server 18-1 validates the virtual objects or licenses issued to the avatar or the user associated with the avatar for those virtual objects in order to ensure that the virtual objects have been legitimately obtained and are legitimately retained by the avatar or user. In another embodiment, the virtual world server 18-1 may validate the virtual objects when the avatar enters the virtual space hosted by the virtual world server 18-1 or just prior to the time that the avatar enters the virtual space hosted by the virtual world server 18-1.

In one embodiment, the virtual world server 18-1 validates the virtual objects by requesting licenses for the virtual objects from the virtual world authority 14. The licenses include information defining the access rights of the avatar or user with respect to the virtual objects. In another embodiment, the avatar or user already has licenses for the virtual objects. The licenses may be stored by the client 20-1, provided to the virtual world server 18-1 when the avatar enters its virtual space, or the like. As such, the virtual world server 18-1 validates the virtual objects by validating the avatar's or user's licenses for the virtual objects.

The virtual world server 18-1 may validate the licenses for the virtual objects in any manner known in the art. For example, the licenses may be digitally signed by the virtual world authority 14. The virtual world server 18-1 may then validate the licenses using the digital signature. More specifically, as will be understood by one of ordinary skill in the art upon reading this disclosure, a license includes, for example, information defining the access rights of the avatar or user, information identifying the issuer of the license which in this case is the virtual world authority 14, and the like. When issuing a license, the virtual world authority 14 may process the contents of the license using a hashing process to generate a message digest. The message digest is then encrypted using a private key of the virtual world authority 14 to provide the digital signature of the virtual world authority 14 for the license. The digital signature is then appended to the license. Thereafter, the virtual world server 18-1 may validate the license by decrypting the digital signature using a public key of the virtual world authority 14 to obtain the message digest. If the decryption process was successful, the virtual world server 18-1 knows that the digital signature is that of the virtual world authority 18-1. The virtual world server 18-1 also processes the contents of the license to generate its own message digest for the license. If the message digest resulting from the digital signature and the message digest generated by the virtual world server 18-1 match, then the license is validated. In addition, the virtual world server 18-1 may interact with the virtual world authority 14 to further validate the license by, for example, querying the virtual world authority 14 to determine whether the license is still valid and has not been revoked. Still further, as will be apparent to one of ordinary skill in the art, additional measures may be taken for validation such as, for example, using a digital certificate to validate the public key of the virtual world authority 14.

In this example, at some point after the virtual objects have been validated individually, the virtual world server 18-1 categorizes the virtual objects into one or more groups of virtual objects (step 104). Alternatively, the virtual world server 18-1 may validate the virtual objects individually after creating the groups. The virtual world server 18-1 may group the virtual objects in any desired manner. For example, the virtual world server 18-1 may group the virtual objects based on the time of last interaction or amount of time since the virtual objects were last interacted with or accessed, frequency of interaction, object location, user rights and/or security, related content category, and/or object affinity. These types of groupings are generally predictive in nature.

More specifically, grouping based on the time of last interaction enables virtual objects that are more likely to be interacted with or accessed in the near future to be grouped together. For example, virtual objects last interacted with or accessed within the past 24 hours may be grouped together to form a first group, virtual objects last interacted with or accessed more than 24 hours ago but less than 5 days ago may be grouped together to form a second group, and so on. Note that if grouping of this type is desired, for each virtual object, information defining the last time the virtual object was accessed or interacted with is stored either at the client 20-1 or the node 12-1 hosting the virtual world server 18-1.

Grouping based on frequency of interaction enables virtual objects that are interacted with or accessed most frequently to be grouped together. As such, as discussed below, one validation process is used to validate the entire group. Each virtual object does not need to be validated individually, thereby substantially reducing the load placed on the system 10 with respect to validation of virtual objects. As an example, virtual objects interacted with or accessed over 100 times may be grouped together to form a first group, virtual objects interacted with or accessed less than 100 times but more than 50 times may be grouped together to form a second group, virtual objects interacted with or accessed less than 50 times but more than 25 times may be grouped together to form a third group, and so on.

Grouping based on location in the virtual world allows virtual objects that are often related or accessed or interacted with at or near the same time to be grouped together. Further, grouping based on location enables the virtual world server 18-1 to validate the group when the avatar is within or near the same location within the virtual world. Note that the location of a virtual object may be at a specific location within the virtual world or within another virtual object within the virtual world. For example, a house is a virtual object that may contain additional virtual objects such as furniture or the like. Thus, for example, all virtual objects within a defined area of the virtual world, or more specifically within a defined area of the virtual space hosted by the virtual world server 18-1, may be grouped together. As another example, the virtual space hosted by the virtual world server 18-1 may be divided into a number of static or dynamic areas, where virtual objects within those areas are grouped together. As another example, all virtual objects within a certain virtual object may be grouped together.

With respect to grouping based on user rights and/or security, virtual object licenses reflect the rights of various users or avatars to interact with, access, and/or possess the virtual object. Additionally, the owner of a virtual object, or user owning or having the right to possess a virtual object, may be able to assign similar rights. For example, an owner may give his friends access to use the virtual object. Grouping based on user rights and/or security can prevent validation operations for virtual objects that a user or users cannot interact with, access, or possess. Also, these types of groups can also provide quick validation for virtual objects shared by a group of users performing a group activity within the virtual world. For example, all virtual objects belonging to a certain user or avatar may be grouped together, all objects belonging to a certain group of users or avatars may be grouped together, all virtual objects accessible to a certain user or avatar may be grouped together, all virtual objects accessible by a certain group of users or avatars may be grouped together, all virtual objects with which a certain user may interact may be grouped together, all virtual objects with which a certain group of users may interact may be grouped together, or the like. Similarly, all virtual objects not belonging to a certain user or avatar may be grouped together, all objects not belonging to a certain group of users or avatars may be grouped together, all virtual objects not accessible to a certain user or avatar may be grouped together, all virtual objects not accessible by a certain group of users or avatars may be grouped together, all virtual objects with which a certain user may not interact may be grouped together, all virtual objects with which a certain group of users may not interact may be grouped together, or the like.

With respect to grouping based on related content categories, the system 10 may maintain an ontology, taxonomy, or the like that describes virtual objects or types of virtual objects and their relationships with other virtual objects or other types of virtual objects. This information may be stored by the virtual world authority 14, stored by each of the nodes 12-1 through 12-N, distributed among the nodes 12-1 through 12-N, stored by one or more other network nodes associated with the system 10, or the like. Based on this information describing relationships between virtual objects or types of virtual objects, the virtual world server 18-1 may categorize the virtual objects into groups of related virtual objects. For example, all clothing virtual objects may be grouped together, all weapons may be grouped together, and the like.

Once the one or more groups are formed, the virtual world server 18-1 generates a group license for each of the groups (step 106). Preferably, the group licenses are temporary. However, the present invention is not limited thereto. More specifically, each of the group licenses is similar to the licenses issued by the virtual world authority 14 but is for the associated group of virtual objects and the issuer of the group license is the virtual world server 18-1 rather than the virtual world authority 14. In addition, the group licenses are preferably digitally signed by the virtual world server 18-1 using the private key of the virtual world server 18-1. Note that while the digital signature is discussed herein, other techniques may be used to authenticate the source of the group licenses and to validate the contents of the group licenses.

It should be noted that in an alternative embodiment, the one or more groups may be formed by the virtual world authority 14 based on, for example, validation requests from the virtual world server 18-1. For example, if the virtual world authority 14 receives requests to validate multiple virtual objects associated with an avatar, the virtual world authority 14 may group the virtual objects or instruct the virtual world server 18-1 to group the virtual objects. In addition, whether or not the one or more groups are formed by the virtual world authority 14 or the virtual world server 18-1, the one or more group licenses may alternatively be generated by the virtual world authority 14 rather than the virtual world server 18-1. The group licenses may be temporary or permanent. More specifically, if the virtual world server 18-1 forms the one or more groups, the virtual world server 18-1 may then request a group license for each of the one or more groups from the virtual world authority 14.

Thereafter, in this example, the avatar associated with the client 20-1 moves from the virtual space hosted by the virtual world server 18-1 to the virtual space hosted by the virtual world server 18-2. As such, the client 20-1 establishes communication with the virtual world server 18-2 (step 108). In this example, at some point after the avatar has moved to the virtual space hosted by the virtual world server 18-2, the virtual world server 18-1 provides the one or more temporary group licenses associated with the avatar to the virtual world server 18-2 (step 110). Alternatively, the group licenses may be stored by the client 20-1, and the client 20-1 may provide the group licenses to the virtual world server 18-2. As another alternative, the virtual world server 18-1 or the client 20-1 may provide the group licenses to the virtual world server 18-2 in a predictive fashion. More specifically, based on the location and possible previous activities of the avatar, the virtual world server 18-1 or the client 20-1 may predict that the avatar will soon enter the virtual space hosted by the virtual world server 18-2. As such, the virtual world server 18-1 or the client 20-1 may provide the group licenses associated with the avatar to the virtual world server 18-2 in advance. The virtual world server 18-2 may then validate the groups in the manner described below prior to or at some point after the avatar enters its virtual space. As yet another alternative, the virtual world server 18-2 may request the group licenses from the virtual world server 18-1 or the client 20-1 when desired.

After receiving the one or more group licenses, the virtual world server 18-2 validates the one or more groups of virtual objects based on their associated group licenses (step 112). As such, for each group, the group of virtual objects is validated using a single validation operation. Each virtual object in the group does not need to be validated individually, thereby reducing the load on the system 10 with respect to validation of virtual objects. Note that group licenses may include an explicit time-out period or similar information defining when the group licenses are to expire.

In one embodiment, in order to validate a group of virtual objects, the virtual world server 18-2 first decrypts a digital signature appended to the group license to obtain a message digest for the group license using a public key of the issuer of the group license, which in this example is the virtual world server 18-1. Successful decryption validates that the group license is from the virtual world server 18-1. Note that the public key may be obtained from the virtual world server 18-1. Alternatively, the public key may be provided by or authenticated by a trusted authority such as, for example, the virtual world authority 14 or a certificate issued by the trusted authority. The virtual world server 18-2 also generates its own message digest from the contents of the group license and compares this message digest to the message digest resulting from the decryption of the digital signature. If the two message digests match, the contents of the group license are validated. If the group license includes an explicit time-out period, then the virtual world server 18-2 determines whether the group license has expired. If so, the virtual world server 18-2 then proceeds to validate each virtual object in the group individually in the manner described above with respect to step 102. If the group license has not expired, the virtual world server 18-2 may interact with the virtual world server 18-1 to ensure that the group license has not been revoked and is still valid and may further interact with the virtual world authority 14 to ensure that the virtual world server 18-1 is a valid issuer of the group license. At this point, the group license is validated. Once the group license is validated, the avatar or user associated with the avatar is enabled to access or interact with the virtual objects in the group as permitted by the group license.

In order to illustrate the principals of the invention, the following exemplary scenario is provided. However, this example is not intended to limit the scope of the present invention. First, an avatar acquires a number of virtual objects such as, for example, clothes, jewelry, weapons, and the like. The avatar may acquire the virtual objects by, for example, completing specified tasks within the virtual world or as a result of an e-commerce transaction wherein the associated user purchases the virtual objects. The virtual world authority 14 issues licenses for the virtual objects giving the avatar the right and permission to possess, access, interact with or otherwise use the virtual objects as applicable. The virtual objects and the licenses may be stored by the associated client, which in this example is the client 20-1. At some point thereafter, the avatar enters the virtual space hosted by the virtual world server 18-1. Assuming that the licenses of the virtual objects need to be validated, the virtual world server 18-1 validates the licenses for the virtual objects individually. Either before or after validating the licenses, the virtual world server 18-1 categorizes the virtual objects associated with the avatar into one or more groups. Once the virtual objects are validated individually, the virtual world server 18-1 issues a group license for each of the groups of virtual objects. Thereafter, when the avatar moves to the virtual space hosted by the virtual world server 18-2, the group licenses are provided to the virtual world server 18-2 either from the virtual world server 18-1 or the client 20-1. At some point such as, for example, an initial attempt of the avatar to access or interact with a virtual object in one of the groups, the virtual world server 18-2 validates the group license for the associated group. As a result, each virtual object in the group is validated, and the avatar is free to access or interact with all of the virtual objects in the group as permitted by the group license.

Figure 3:
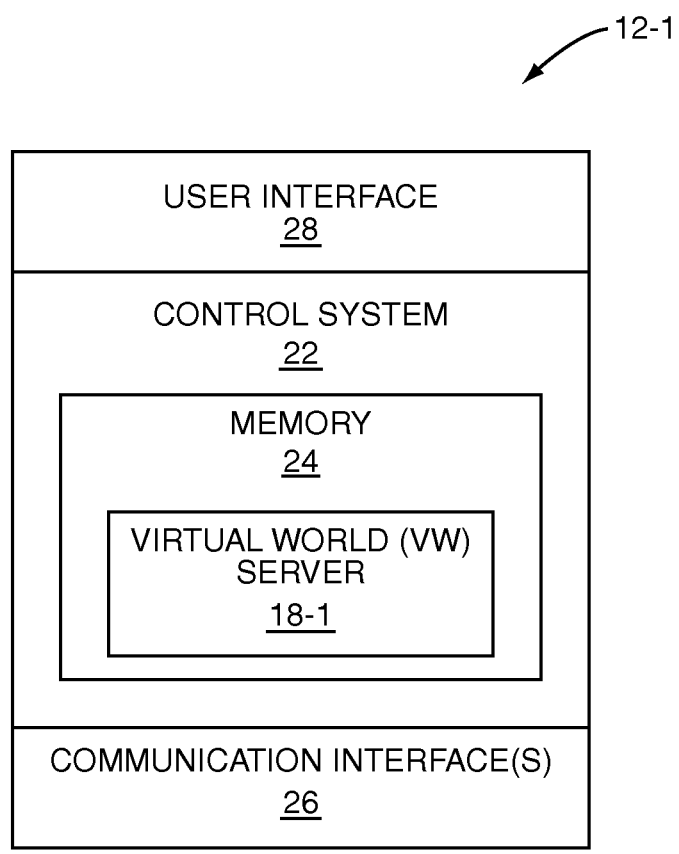
FIG. 3 is a block diagram of one of the nodes of FIG. 1 according to one embodiment of the present invention.

FIG. 3 is a block diagram of the node 12-1 of FIG. 1 according to one embodiment of the present invention. This discussion is equally applicable to the other nodes 12-2 through 12-N. In general, the node 12-1 includes a control system 22 having associated memory 24. In this example, the virtual world server 18-1 is implemented in software and stored in the memory 24. However, the present invention is not limited thereto. The virtual world server 18-1 may be implemented in software, hardware, or a combination thereof. The node 12-1 also includes one or more communication interfaces 26 communicatively coupling the node 12-1 to the network 16 and the clients 20-1 and 20-2 (FIG. 1). Note that the node 12-1 may communicate with the other nodes 12-2 through 12-N, the virtual world authority 14, and the clients 20-1 and 20-2 via a single communication interface or via separate communication interfaces. The node 12-1 also includes a user interface 28, which may include, for example, one or more user input devices, a display, speakers, and the like.

The present invention provides substantial opportunity for variation without departing from the spirit or scope of the present invention. For example, while the present invention has been discussed above with respect to a distributed virtual world, the present invention is applicable to any distributed architecture including a number of distributed network nodes wherein it is desirable to validate the same virtual object at different network nodes over time. In addition, while much of the discussion above focuses on validating virtual objects associated with an avatar, the present invention is not limited thereto. For example, the present invention may be used to validate any virtual objects that may be accessed or interacted with from the virtual spaces of multiple virtual world servers in a distributed virtual world architecture.

Those skilled in the art will recognize improvements and modifications to the preferred embodiments of the present invention. All such improvements and modifications are considered within the scope of the concepts disclosed herein and the claims that follow.

What is claimed is:

1. A method of validating virtual objects in a distributed virtual world comprising:
grouping by a virtual world server a plurality of virtual objects associated with an avatar within a first virtual space of the distributed virtual world hosted by a first virtual world server into a group of virtual objects;
generating by the virtual world server a group license for the group of virtual objects;
predicting that the avatar will move to a second virtual space of the distributed virtual world hosted by a second virtual world server based on a location of the avatar and previous activities of the avatar;
sending by the virtual world server the group license to the second virtual world server based on the prediction; and
validating the group of virtual objects at the second virtual world server based on the group license such that the virtual objects are validated for use in the second virtual space hosted by the second virtual world server.

2. The method of claim 1 wherein grouping the plurality of virtual objects comprises grouping the plurality of virtual objects at the first virtual world server.

3. The method of claim 1 wherein grouping the plurality of virtual objects comprises grouping the plurality of virtual objects at a virtual world authority based on validation requests from the first virtual world server.

4. The method of claim 1 wherein generating the group license comprises generating the group license at a virtual world authority.

5. The method of claim 1 wherein generating the group license comprises generating the group license at the first virtual world server.

6. The method of claim 5 further comprising validating each of the plurality of virtual objects individually prior to generating the group license.

7. The method of claim 1 wherein grouping the plurality of virtual objects comprises grouping the plurality of virtual objects based on at least one of a group consisting of: time of last interaction, frequency of interaction, location within the distributed virtual world, user rights, and relationships of the plurality of virtual objects.

8. The method of claim 1 wherein validating the group of virtual objects comprises validating the group of virtual objects at the second virtual world server based on the group license such that the virtual objects are validated for use by the avatar within the second virtual space hosted by the second virtual world server.

9. The method of claim 8 wherein providing the group license to the second virtual world server comprises providing the group license from the first virtual world server to the second virtual world server when the avatar moves from the first virtual space hosted by the first virtual world server to the second virtual space hosted by the second virtual world server.

10. The method of claim 8 wherein the group license is stored by a client associated with the avatar, and providing the group license to the second virtual world server comprises providing the group license from the client to the second virtual world server when the avatar moves from the first virtual space hosted by the first virtual world server to the second virtual space hosted by the second virtual world server.

11. The method of claim 8 further comprising predicting that the avatar will move to the second virtual space hosted by the second virtual world server before the avatar moves to the second virtual space.

12. The method of claim 11 wherein validating the group of virtual objects comprises validating the group of virtual objects at the second virtual world server based on the group license before the avatar enters the second virtual space hosted by the second virtual world server.

13. The method of claim 1 wherein generating the group license comprises:
   generating the group license at the first virtual world server; and
   digitally signing the group license such that the group license comprises a digital signature of the first virtual world server;
   wherein validating the group of virtual objects comprises validating the group license based on the digital signature of the first virtual world server.

14. The method of claim 1 wherein the group license is a temporary group license.

15. A system comprising:
   a) a first virtual world server comprising a processor and memory storing instructions such that when the processor executes the instructions, the processor causes the first virtual world server to:
      i) host a first virtual space of a distributed virtual world
      ii) identify a group of virtual objects including a plurality of virtual objects associated with an avatar;
      iii) obtain a group license for the group of virtual objects;
      iv) predict that the avatar will move to a second virtual space of the distributed virtual world hosted by a second virtual world server based on a location of the avatar and previous activities of the avatar; and
      v) send the group license to the second virtual world server based on the prediction, wherein the group of virtual objects is validated for use within the second virtual space hosted by the second virtual world server based on the group license.

16. The system of claim 15 wherein the processor further causes the first virtual world server to form the group of virtual objects to identify the group of virtual objects.

17. The system of claim 15 wherein the processor further causes the first virtual world server to receive information identifying the group of virtual objects from a virtual world authority to identify the group of virtual objects.

18. The system of claim 15 wherein the processor further causes the first virtual world server to obtain the group license from a virtual world authority.

19. The system of claim 15 wherein the processor further causes the first virtual world server to generate the group license to obtain the group license.

20. The system of claim 15 wherein the processor further causes the first virtual world server to validate each of the plurality of virtual objects individually prior to generating the group license.

21. The system of claim 15 wherein the processor further causes the first virtual world server to form the group the plurality of virtual objects in order to identify the group of virtual objects based on at least one of a group consisting of: time of last interaction, frequency of interaction, location within the distributed virtual world, user rights, and relationships of the plurality of virtual objects.

22. The system of claim 15 wherein the system further comprises the second virtual world server and the second virtual world server validates the group of virtual objects based on the group license such that the virtual objects are validated for use in the second virtual space hosted by the second virtual world server.

23. The system of claim 22 wherein the second virtual world server validates the group of virtual objects based on the group license such that the virtual objects are validated for use by the avatar within the second virtual space hosted by the second virtual world server.

24. The system of claim 15 wherein the processor further causes the first virtual world server to provide the group license to the second virtual world server when the avatar moves from the first virtual space hosted by the first virtual world server to the second virtual space hosted by the second virtual world server.

25. The system of claim 15 wherein the system further comprises the second virtual world server and the second virtual world server is configured to validate the group of virtual objects based on the group license before the avatar enters the second virtual space hosted by the second virtual world server.

26. The system of claim 15 wherein the system further comprises the second virtual world server and the processor further causes the first virtual world server to digitally sign the group license such that the group license comprises a digital signature of the first virtual world server, and the second virtual world server validates the group of virtual objects by validating the group license based on the digital signature of the first virtual world server.

27. The system of claim 15 wherein the group license is a temporary group license.

28. A device comprising:
a processor; and
memory associated with the processor, the memory storing instructions such that when the processor executes the instructions, the processor causes the device to:
  i) identify a group of virtual objects including a plurality of virtual objects associated with an avatar;
  ii) obtain a group license for the group of virtual objects;
  iii) predict that the avatar will move to a second virtual space of the distributed virtual world hosted by a second virtual world server based on a location of the avatar and previous activities of the avatar; and
  iv) send the group license to the second virtual world server based on the prediction.

* * * * *